United States Patent
Magadi Rangaiah et al.

(10) Patent No.: US 8,976,701 B2
(45) Date of Patent: *Mar. 10, 2015

(54) METHOD FOR HANDLING INTER-RADIO ACCESS TECHNOLOGY MEASUREMENT REQUESTS IN A MOBILE TELECOMMUNICATIONS DEVICE

(71) Applicant: BlackBerry Limited, Waterloo (CA)

(72) Inventors: Raghavendra Magadi Rangaiah, West Bromwich (GB); Andrew John Farnsworth, Kidderminster (GB); Giri Narayana Reddy, Birmingham (GB); David Philip Hole, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,637

(22) Filed: May 30, 2014

(65) Prior Publication Data

US 2014/0269394 A1 Sep. 18, 2014

Related U.S. Application Data

(63) Continuation of application No. 12/433,178, filed on Apr. 30, 2009, now Pat. No. 8,743,775.

(51) Int. Cl.
*G01R 31/08* (2006.01)
*H04W 4/00* (2009.01)
(Continued)

(52) U.S. Cl.
CPC .......... *H04W 24/10* (2013.01); *H04W 36/0088* (2013.01); *H04W 36/14* (2013.01); *H04W 36/30* (2013.01); *H04W 88/06* (2013.01)
USPC .......................................... 370/252; 370/328

(58) Field of Classification Search
CPC .................................................... H04W 36/30
USPC ....................................................... 370/252
See application file for complete search history.

(56) References Cited

U.S. PATENT DOCUMENTS 5,784,363 A * 7/1998 Engstrom et al. ............. 370/332
6,208,860 B1 3/2001 Kim et al.
(Continued)

FOREIGN PATENT DOCUMENTS

WO 2004/032539 A1 4/2004
WO 2007/080348 A2 7/2007
(Continued)

OTHER PUBLICATIONS

3rd Generation Partnership Project; Technical Specification Group GSM/EDGE Radio Access Network, Generic Access network (GAN); Mobile GAN Interface Layer 3 specification (Release 8); 3GPP TS 44.318 V8.5.0; Apr. 1, 2009; 245 pages.
(Continued)

*Primary Examiner* — Gerald Smarth
(74) *Attorney, Agent, or Firm* — Fitch, Even, Tabin & Flannery LLP

(57) ABSTRACT

Apparatus and a method are described for handling inter-radio access technology measurement reports in a radio telecommunications device, the device being operable with a first cellular radio access technology (e.g. UTRAN, E-UTRAN), GERAN and Generic Access Network, the radio telecommunications device being capable of adopting a cellular preferred mode. The method comprises, in the radio telecommunications device, when the radio telecommunications device is in cellular preferred mode and operating with the first cellular radio access technology and the radio telecommunications device is registered with a Generic Access Network Controller that operates as a GERAN network component, and a quality of a signal from the first cellular radio access technology is below a certain threshold and a quality of a signal from the GAN is above a certain threshold and a request has been received to send an inter-RAT measurement report, generating inter-radio access technology measurements and, when there is at least one GERAN cell that satisfies a triggering condition, transmitting a measurement report in respect of the GERAN cell(s) and a measurement report in respect of the generic access network.

12 Claims, 7 Drawing Sheets

(51) Int. Cl.
*H04W 24/10* (2009.01)
*H04W 36/00* (2009.01)
*H04W 36/14* (2009.01)
*H04W 36/30* (2009.01)
*H04W 88/06* (2009.01)

(56) References Cited

U.S. PATENT DOCUMENTS

| | | | |
|---|---|---|---|
| 8,014,327 B2* | 9/2011 | Waldeck et al. | 370/310 |
| 8,743,775 B2 | 6/2014 | Rangaiah et al. | |
| 2004/0002334 A1 | 1/2004 | Lee et al. | |
| 2008/0014941 A1* | 1/2008 | Catovic et al. | 455/436 |
| 2008/0014957 A1 | 1/2008 | Ore | |
| 2008/0020770 A1 | 1/2008 | Hofmann | |
| 2008/0032706 A1* | 2/2008 | Sheynblat et al. | 455/456.1 |
| 2008/0293419 A1 | 11/2008 | Somasundaram et al. | |
| 2008/0299982 A1 | 12/2008 | Lee et al. | |
| 2009/0061877 A1* | 3/2009 | Gallagher et al. | 455/436 |
| 2009/0093251 A1 | 4/2009 | Cai et al. | |
| 2009/0168662 A1* | 7/2009 | Tsuboi et al. | 370/252 |
| 2009/0323630 A1* | 12/2009 | Daoud-Triki et al. | 370/331 |
| 2010/0142498 A1 | 6/2010 | Hyounhee | |
| 2010/0273504 A1 | 10/2010 | Bull et al. | |
| 2010/0279682 A1 | 11/2010 | Rangaiah et al. | |

FOREIGN PATENT DOCUMENTS

| | | |
|---|---|---|
| WO | 2008/000914 A1 | 1/2008 |
| WO | 2009/045070 A2 | 4/2009 |

OTHER PUBLICATIONS

3rd Generation Partnership Project; Technical Specification Group Radio Access Network; Radio Resource Control (RRC); Protocol Specification (Release 8); 3GPP TS 25.331 V8.6.0; Apr. 1, 2009; 1673 pages.

Extended European Search Report from related European Patent Application No. 09159256.8 dated Sep. 25, 2009; 8 pages.

Article 94(3) EPC from related European Patent Application No. 09159256.8 dated May 9, 2011; 6 pages.

\* cited by examiner

METHOD FOR HANDLING INTER-RADIO ACCESS TECHNOLOGY MEASUREMENT REQUESTS IN A MOBILE TELECOMMUNICATIONS DEVICE

RELATED APPLICATIONS

The present application is a continuation of U.S. patent application Ser. No. 12/433,178, filed Apr. 30, 2009, the contents of which are incorporated herein by reference.

TECHNICAL FIELD

This application relates to mobile telecommunications systems in general, having particular application in mobile telecommunications device operable with a plurality of radio access networks in general, and in particular relates to an apparatus and a method for handling inter-radio access technology measurement requests in a mobile telecommunications device.

DESCRIPTION OF THE RELATED ART

In a typical cellular radio system, mobile user equipment communicates via one or more cellular radio access networks (RANs) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

UMTS (Universal Mobile Telecommunications System) is known as a third generation (3G) system in which the radio access network is known as UMTS Terrestrial Radio Access Network (UTRAN). E-UTRAN is another radio access network. GERAN (GSM EDGE Radio Access Network) is a second generation (2G) system, based on GSM, which was developed to provide improved data access compared with GSM.

In the following, reference will be made to GERAN, GSM EDGE, GPRS, UTRAN, E-UTRAN and UMTS and to particular standards. However it should be understood that the invention is also applicable to other mobile telecommunications system.

A cellular radio access network covers a geographical area typically divided into a plurality of cell areas. Each cell area is served by at least one base station, which in UMTS may be referred to as a Node B and in GSM is referred to as base station (BS). Each cell is typically identified by a unique identifier which is broadcast in the cell. The base stations communicate at radio frequencies over an air interface with the radio devices within range of the base station. Several base stations may be connected to a radio network controller (RNC) which controls various activities of the base stations. The radio network controllers are typically connected to a core network.

Also available are so-called Generic Access Networks (GANs). These are typically not wide area cellular systems as described above but are local access networks systems, for instance implemented with access devices (typically with a wireless interface with the user equipment) that comply with IEEE standards 802.xx (e.g. WiFi hotspots, Wireless Local Area Networks or broadband wireless routers, for instance in office or domestic premises). GAN technology provides an access network to the mobile core network that can be used to access the existing circuit-switched and packet-switched services. Generally, the provision of the generic access network is based on use of unlicensed spectrum (e.g. WLAN) and IP-based broadband access network for instance as set out in IEEE 802.xx standards. GAN enables typical wireless telecommunications services to be delivered at homes or in offices. The intention is for end users to enjoy the same service as with the wide area cellular network(s) but access it via a local access point such as a broadband wireless router. Fixed/mobile convergence may therefore be provided.

Various standardization bodies are known to publish and set standards for mobile telecommunication systems, each in their respective areas of competence. For instance, the 3GPP (Third Generation Partnership Project) publishes and sets standards for GSM (Global System for Mobile Communications) based UMTS, and the 3GPP2 (Third Generation Partnership Project 2) publishes and sets standards for CDMA (Code Division Multiple Access) based UMTS. 3GPP Release 8 introduces LTE (Long Term Evolution) and E-UTRAN. 3GPP also publishes and set standards for GAN systems. Within the scope of a particular standardization body, specific partners publish and set standards in their respective areas.

The 3GPP specification TS 43.318 v8.4.0 (hereby incorporated by reference in its entirety) relates to the Generic Access Network, an access network providing access to A/Gb or Iu interfaces via an IP network. The 3GPP specification TS 44.318 v8.5.0 (hereby incorporated by reference in its entirety) relates to the Generic Access Network: Mobile GAN interface layer 3 specification and Annex E relates to GAN Specific Requirements for Interworking with UTRAN. The 3GPP specification TS 25.331 v5.23.0 (hereby incorporated by reference in its entirety) relates to the Protocol Specification for Radio Resource Control (RRC) of the UMTS Radio Access Network and Section 14.3 relates to inter-RAT measurements and Section 14.3.1.1 provides a description of an inter-RAT reporting event known as Event 3A, configured when the estimated quality of the currently used UTRAN frequency is below a certain threshold and the estimated quality of the other system is above a certain threshold.

Consider a wireless mobile device, generally referred to as user equipment (UE) or a mobile station (MS), that complies with the 3GPP specifications for the UMTS protocol and the specifications for the GSM EDGE protocol and the specifications for the GAN protocol. Such a MS may be connected to the 3G network, the 2G network or the GAN. In accordance with Annex E.1 of the 44.318 specification, when the MS is in GERAN/UTRAN preferred mode (also referred to as cellular preferred mode) and an event 3A has been configured, the MS shall only send a measurement about the GAN cell to trigger handover when no GERAN cells from the Inter-RAT measurement object list satisfy the triggering condition of the configured Event (as described in TS 25.331).

There are thus proposed strategies for handling inter-radio access technology measurement requests in a mobile telecommunications device. A number of such strategies are detailed below.

Other aspects and features of the proposed strategy will become apparent to those ordinarily skilled in the art upon review of the following description of specific embodiments of an apparatus and method for handling inter-radio access technology measurement requests in a mobile telecommunications device.

BRIEF DESCRIPTION OF THE DRAWINGS

Embodiments will now be described, by way of example only, with reference to the attached drawings, in which.

Where the same reference numerals are used in different figures, these are used to denote similar elements.

DETAILED DESCRIPTION OF THE DRAWINGS

Figure 1:
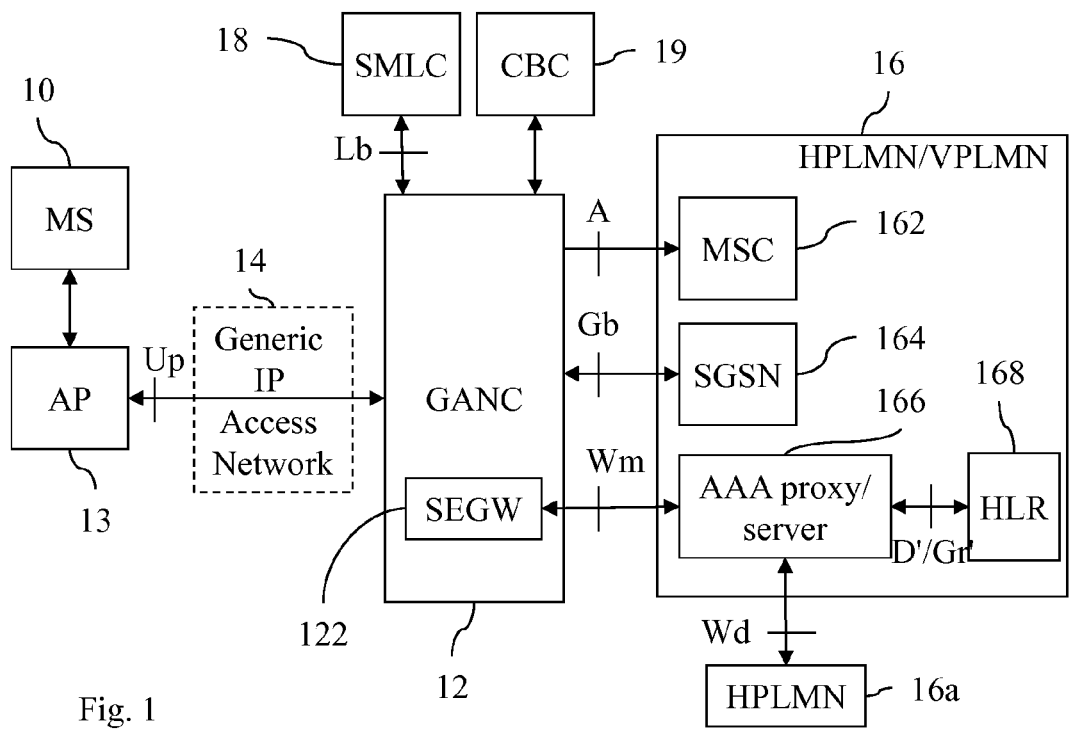
FIG. 1 shows the GAN A/Gb mode functional architecture.

A method and apparatus for handling inter-radio access technology measurement requests in a mobile telecommunications device is described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for handling inter-radio access technology measurement reports in a mobile telecommunications device, the device being operable with a first cellular radio access technology (e.g. UMTS), a second cellular radio access technology (e.g. GPRS) and a non-cellular radio access technology (e.g. Generic Access Network (e.g. via an access point conforming to one of the IEEE 802.xx standards)), the mobile telecommunications device being capable of adopting a cellular preferred mode, the method comprising, in the mobile telecommunications device, when the mobile telecommunications device is in a cellular preferred mode and operating with the first cellular radio access technology and the mobile telecommunications device is registered with a Generic Access Network, in response to a trigger based on an estimated quality of the first cellular radio access technology and the second cellular radio access technology, when there is at least one cell of the second cellular radio access technology that satisfies a triggering condition, sending a measurement report in respect of the second cellular radio access technology and a measurement report in respect of the generic access network. In other aspects, the invention encompasses apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

As set out in 3GPP TS 43.318 section 1, GAN supports two modes of operation: GAN A/Gb mode and GAN Iu mode. GAN A/Gb mode supports an extension of GSM/GPRS mobile services that is achieved by tunnelling Non Access Stratum (NAS) protocols between the MS and the Core Network over an IP network and the A and Gb interfaces to the MSC and SGSN, respectively. GAN Iu mode supports an extension of UMTS mobile services that is achieved by tunnelling Non Access Stratum (NAS) protocols between the user equipment (MS) and the Core Network over an IP network and the Iu-cs and Iu-ps interfaces to the MSC and SGSN, respectively. Both GAN modes are complements to traditional GSM/GPRS/EDGE/UMTS radio access network coverage. A Generic Access Network Controller (GANC) is a network node that connects to the MSC and SGSN via the A-interface and Gb interface (GAN A/Gb mode) or the Iu-cs interface and Iu-ps interface (GAN Iu mode) and enables access via a generic IP network.

FIG. 1 shows an example of the functional architecture for the GAN A/Gb mode (where the GANC appears to the core network as a GERAN Base Station Subsystem (BSS)). The mobile station (MS) 10 connects to the GANC 12 via an Access Point (AP) 13 and the Generic IP Access Network 14. An interface Up is defined between the MS 10 and the GANC 12. The GANC 12 then connects to the Host or Visitor Public Land Mobile Network (HPLMN/VPLMN) 16 via interfaces A (to a Mobile Switching Centre (MSC) 162) and Gb (to a Serving GPRS Support Node (SGSN) 164). The GANC 12 also connects to a Serving Mobile Location Centre (SMLC) 18 via an interface Lb and to a Cell Broadcast Centre (CBC) 19. The GANC also comprises a Security Gateway (SEGW) 122 which connects to an Accounting, Authorisation and Authentication (AAA) proxy/server 166 via an interface Wm. The AAA Proxy/server 166 connects to a Home Location Register (HLR) 168 via an interface D'/Gr'. The AAA Proxy/server 166 also connects to another HPLMN 16a via an interface Wd in the roaming case.

Figure 2:
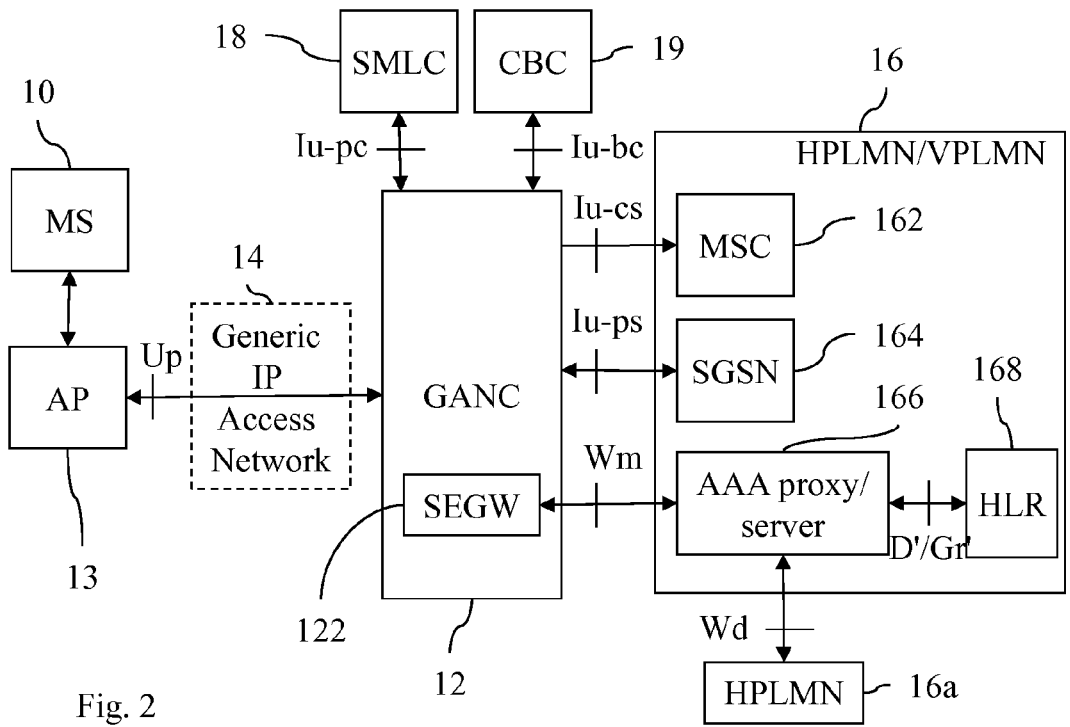
FIG. 2 shows the GAN Iu mode functional architecture.

FIG. 2 shows an example of the functional architecture for the GAN Iu mode (where the GANC appears to the core network as a UTRAN Radio Network Controller (RNC)). The mobile station (MS) 10 connects to the GANC 12 via an Access Point (AP) 13 and the Generic IP Access Network 14. An interface Up is defined between the MS 10 and the GANC 12. The GANC 12 then connects to the Host or Visitor Public Land Mobile Network (HPLMN/VPLMN) 16 via interfaces Iu-cs (to a Mobile Switching Centre (MSC) 162) and Iu-ps (to a Serving GPRS Support Node (SGSN) 164). The GANC 12 also connects to a Serving Mobile Location Centre (SMLC) 18 via an interface Iu-pc and to a Cell Broadcast Centre (CBC) 19 via an interface Iu-bc. The GANC also comprises a Security Gateway (SEGW) 122 which connects to an Accounting, Authorisation and Authentication (AAA) proxy/server 166 via an interface Wm. The AAA Proxy/server 166 connects to a Home Location Register (HLR) 168 via an interface D'/Gr'. The AAA Proxy/server 166 also connects to another HPLMN 16a via an interface Wd in the roaming case.

The Access Point ID (AP-ID) is the physical identity (e.g. MAC address) of the generic IP access network point 13 through which the MS is accessing the GAN service. This identifier is provided by the mobile device 10 (obtained via broadcast from the AP 13) to the GANC 12 via the Up interface, when the MS 10 requests GAN service. The AP-ID may be used by the GANC 12 to support location services. The AP-ID may also be used by the service provider to restrict GAN service access via only authorized APs 13.

On the core network interfaces, a GANC appears as an RNC/BSC and in GAN A/Gb mode the same identifiers (i.e. ARFCN and BSIC) can be used which are also used for GERAN cells. The implications of this are that legacy RNCs and BSCs do not have to be upgraded to support GAN cells deployed in the network; their neighbour cell lists can include GAN cells within the GERAN neighbour cell list, and similarly measurement reports can indicate that the mobile has a connection to a GANC using the legacy 2G measurement report approach.

Measurement reports for GAN "cells" are unusual because there is no true measurement of the link performance over the GAN network, taking into account e.g. the quality of the link between the MS 10 and the AP 13 (e.g. an IEEE 802.11 link (Wifi)). Instead, according to TS 44.318 Annex E, in GAN A/Gb mode, all measurements for GAN cells are reported as the 'highest' quality (i.e. RSSI=63). This may trigger a handover towards a GAN cell when it is reported.

Event 3A is triggered in the MS when the estimated quality of the currently used UTRAN frequency is below a certain threshold and the estimated quality of an other system (e.g. one or more alternative cells of another RAT e.g. GERAN) is above a certain threshold. This may occur, for example, when a mobile is moving out of 3G coverage but remains in (or is entering) non-3G coverage.

A MS which supports 3G, 2G and GAN radio access technologies can report 2G and GAN cells to a UTRAN in event 3A reports. However, if the user preference is set to cellular preferred (GERAN/UTRAN preferred) then, according to 44.318 v8.5.0 Annex E.1, GAN cells must not be reported unless there are no 2G cells that satisfy the event 3A triggering condition. If the handover to 2G fails (e.g. the MS cannot synchronise to the BSC, or the BSC is congested and cannot accept the call) the UTRAN does not know that a GAN cell is available as a possible target to accept the call. If the 3G coverage is lost, then the call gets dropped.

A scenario where this could arise is, for example, entering a building in a rural environment, where there are very few macro (i.e. 2G & 3G) cells, but where GAN coverage is available in the building. A mobile may be able to register with the GAN cell in the building; at the same time, an Event 3A is triggered due to the falling 3G signal level in the building, while 2G coverage remains acceptable. In line with the existing rules, the mobile reports only the 2G cell in its measurement report and the UTRAN attempts handover.

However, say there is only one 2G cell available, and this is unavailable for some reason (e.g. congestion) and the handover preparation towards the 2G cell fails. As the mobile has not been allowed to report the GAN cell availability, the network does not know to try a handover to the GAN cell. As the user moves further into the building, macro coverage falls further. By the time that the 2G cell quality is so poor that the mobile is allowed to report the GAN cell, 3G coverage has fallen to such a low level that the handover signalling fails and the call is dropped.

A technique is proposed in which a mobile device reports a GAN cell in an Event 3A measurement report, even when the MS settings are set to cellular is preferred and there are GERAN Cells from the inter-RAT measurement object list that satisfy the triggering condition of the configured event. For instance, this may be either:

as part of the initial measurement report when Event 3A is triggered,
immediately afterwards, as a separate report, or
as a separate report, with some delay (for instance sufficient to allow a handover to 2G preparation phase, therefore allowing for a handover that has been attempted but has failed on the network side).

Thus, to attempt to prevent call drop, when a MS reports an Event 3A measurement report to UTRAN it may sometimes be desirable to also report the GAN cell(s). If 2G cells meet event 3A triggering criteria, then the MS also sends a measurement report in respect of a GAN cell as well as 2G cells. Previously in the prior art, the MS reports either only 2G or only GAN in the case of cellular-preferred. Reporting both 2G and GAN target cells where available should increase the Inter System Handover (ISHO) success thereby call success since, having unsuccessfully attempted to initiate a handover to 2G, an RNC may attempt preparation of a handover to GAN.

Therefore when the MS is in GERAN/UTRAN preferred mode and an event 3A has been configured, the MS may include a measurement report about the GAN cell to trigger handover when one or more GERAN cells from the Inter-RAT measurement object list satisfy the triggering condition of the configured Event (as described in TS 25.331). By way of example, if the MS does include 2G and GAN cells in event 3A reports it could do so in one of the following ways.

List the 2G cells first and the GAN cells last in the cells reported in event 3A measurement report. In this embodiment, the MS reports that the GAN cell has the best possible receiving level (i.e. GSM carrier RSSI=63).

List the 2G cells first and the GAN cells last in the cells reported in event 3A measurement report, and report GAN cells using an RSSI value below that of the weakest 2G cell reported.

Send one report with just the 2G cells that satisfy conditions for sending event 3A. Then immediately send another report containing the registered GAN cell.

Send one report with just the 2G cells that satisfy conditions for sending event 3A. Then, after a delay to allow handover to 2G to be requested, if an indication that such a handover has been attempted has not been received by the MS and GAN is still strong and 3G is still weak, then send another 3A report to the network listing the GAN cell to indicate a desire to handover to the registered GAN cell.

Figure 3:
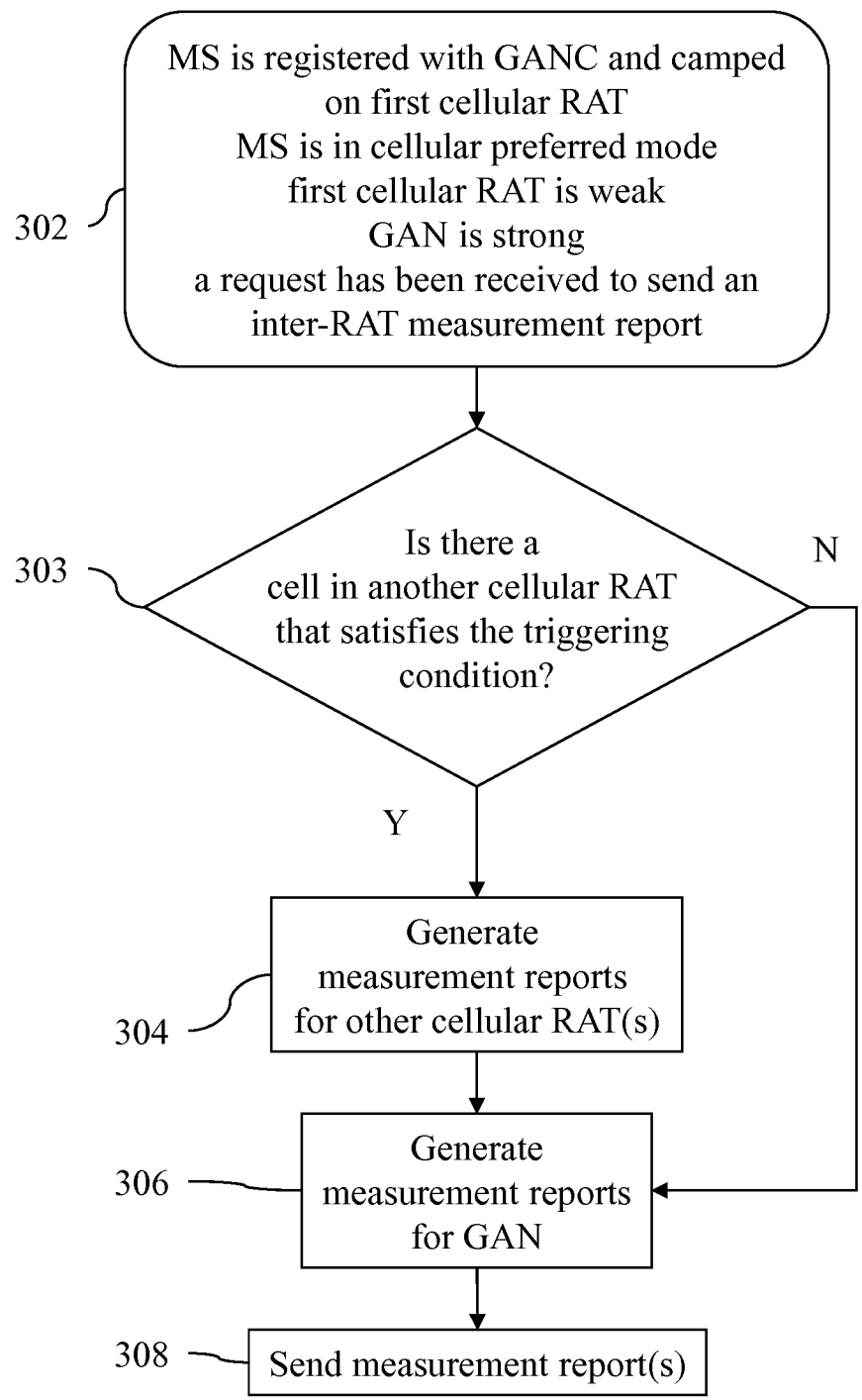
FIG. 3 is a flow chart illustrating the described technique.

FIG. 3 is a flow chart illustrating the technique. The MS enters a start state (302) when the following conditions are met. The MS is registered with a GANC that appears as a network component of the second cellular radio access technology, is camped on a first cellular RAT (e.g. UTRAN) and is in cellular preferred (e.g. UTRAN/GERAN preferred) mode (302). The MS 10 has detected that the connection with the first cellular network (UTRAN) is weak (i.e. a quality of a signal from the UTRAN is below a certain threshold (for example an estimated quality of the currently used UTRAN frequency is below a certain threshold)) and that the connection with the GAN is strong (i.e. that a quality of a signal from the GAN (for example signal strength, Block non-Error Rate, Signal to Noise Ratio) meets a certain threshold) and has received a request (in practice from the first cellular RAT (UTRAN)) to send an inter-RAT measurement report. In practice, this request occurs when the estimated quality of the currently used cellular radio access technology is below a certain threshold. When the MS is operating according to UMTS, this request is generated by the UTRAN when the estimated quality of the currently used UTRAN frequency is below a certain threshold and will cause an inter-RAT measurement report for event 3a, as set out in TS 25.331 section 14.3.1.1, when the estimated quality of the currently used UTRAN frequency is below a certain threshold and when the estimated quality of the other system (GERAN) is above a certain threshold. The MS then checks (303) whether there is a cell in another cellular RAT (e.g. GERAN) that satisfies the triggering condition. If so, the MS then generates (304) a measurement report for the neighbouring cells of the other cellular RAT (e.g. GERAN). The MS also generates (306) a measurement report for the GAN cell. The MS then sends (308) the generated measurement reports for the neighbouring cells and the GAN cell to the network. If there is no cell in another cellular RAT that satisfies the triggering condition, then the MS generates (306) a measurement report for the GAN cell only and the MS then sends (308) the generated measurement report for the GAN cell to the network.

Figure 4:
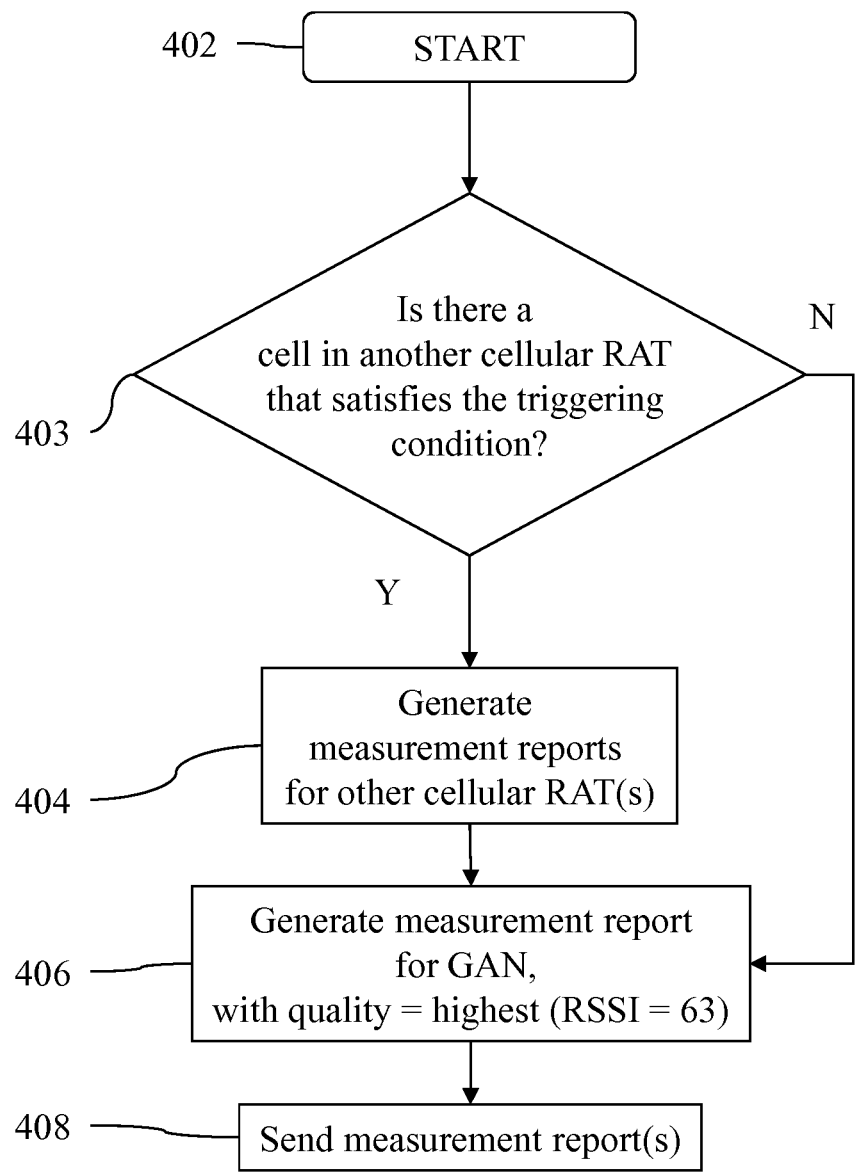
FIG. 4 is a flow chart illustrating a first embodiment of the described technique.

FIG. 4 is a flow chart illustrating a first embodiment of a method carried out by the MS 10 to implement this technique. The same start conditions as discussed with reference to FIG. 3 are in place (402). The MS is in cellular preferred mode, the MS is registered with a GANC that that operates as a network component of the second cellular radio access technology (e.g. a GERAN network component) and camped on first cellular RAT e.g. UMTS, the connection with the first cellular RAT is weak, the connection with the GAN is strong and a request has been received to send an inter-RAT measurement report. The MS checks whether there is a cell in another cellular RAT that satisfies the triggering condition (operation 403). If there is at least one cell in another cellular RAT (e.g. GERAN) that satisfies the triggering condition, the MS 10 configures measurement reports for the other cellular RAT (operation 404) and then generates a measurement report for the GAN, allocating an indicator of highest quality to the GAN cell (e.g. RSSI=63 for a GAN A/Gb mode) (operation 406). The MS then sends an event 3A measurement report including both the 2G cell(s) and the GAN cell (operation 408). In one embodiment, the GAN cell may be listed after the 2G cells that are reported. If there is no cell in another cellular RAT (e.g. GERAN) that satisfies the triggering condition, the MS generates a measurement report for the GAN, allocating an indicator of highest quality to the GAN cell (e.g. RSSI=63 for a GAN A/Gb mode) (operation 406). This is then sent to the network (operation 408).

Figure 5:
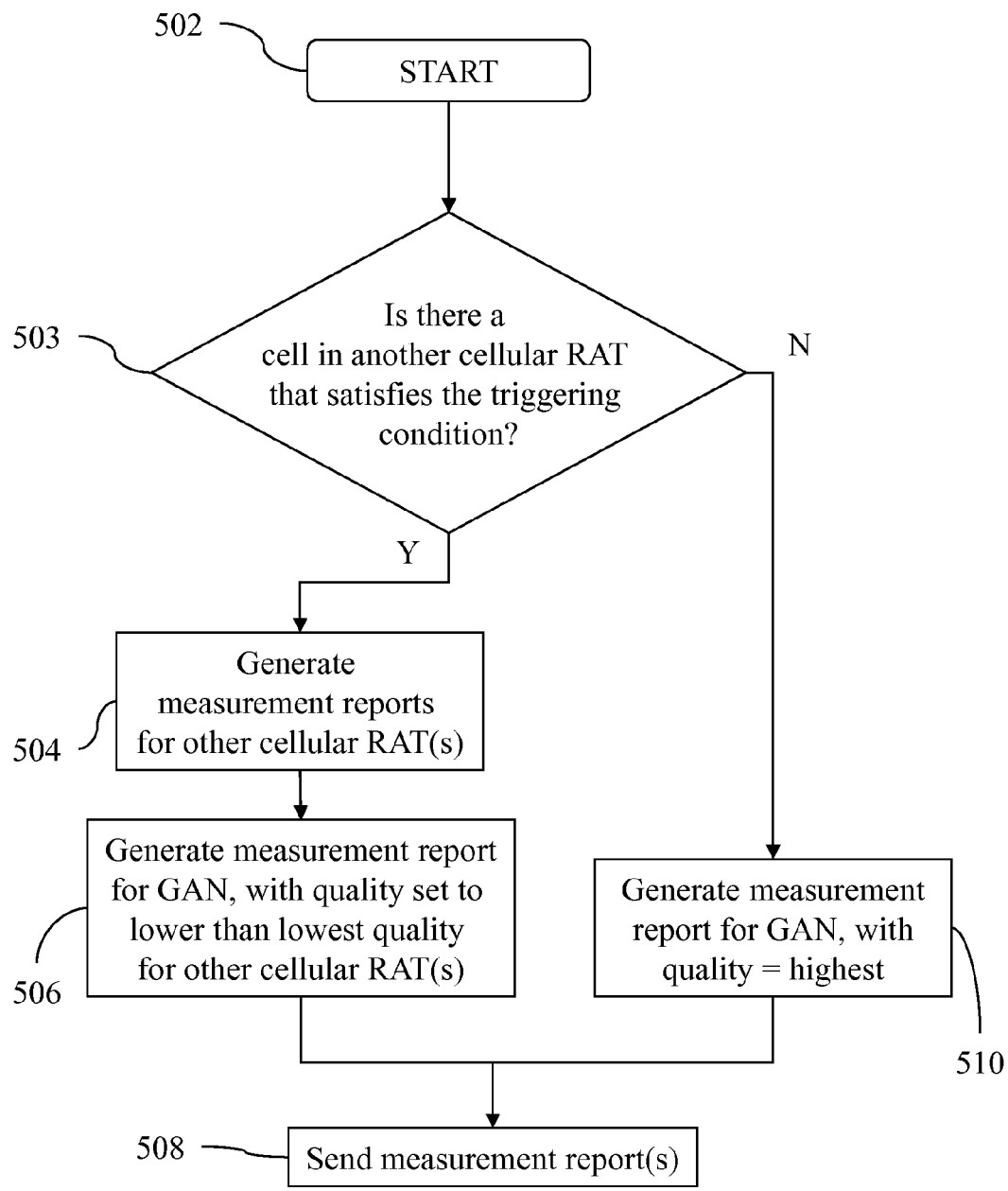
FIG. 5 is a flow chart illustrating a second embodiment of the described technique.

FIG. 5 is a flow chart illustrating a further embodiment of a method carried out by the MS 10 to implement this technique. The same start conditions as discussed with reference to FIG. 3 are in place (502). The MS is in cellular preferred mode, the MS is registered with a GANC that that operates as a network component of the second cellular radio access technology (e.g. a GERAN network component) and camped on first cellular RAT e.g. UMTS, the connection with the first cellular RAT is weak, the connection with the GAN is strong and a request has been received to send an inter-RAT measurement report. The MS checks whether there is a cell in another cellular RAT that satisfies the triggering condition (operation 503). If there is at least one cell in another cellular RAT (e.g. GERAN) that satisfies the triggering condition, the MS 10 configures measurement reports for the other cellular RAT (operation 504) and then generates a measurement report for the GAN, allocating an indicator of quality to the GAN cell that is lower than the lowest indicator of quality for the cells of the other RAT (e.g. RSSI for a GAN A/Gb mode) (operation 506). For example, the reported RSSI of the GAN Cell is set to just below the weakest 2G cell reported. The MS then sends an event 3A measurement report including both the 2G cell(s) and the GAN cell (operation 508). In this embodiment, when applied to 2G cells, when configuring a measurement report for the GAN cell (operation 506) the mobile station MS 10 allocates a RSSI to the GAN cell lower than the lowest RSSI of 2G cells, in other words it does not use the RSSI=63 level in this case. Additionally or alternatively, the GAN cell may be listed last in a combined measurement report of the other cellular RAT and the GAN. If there is no cell in another cellular RAT (e.g. GERAN) that satisfies the triggering condition, the MS generates a measurement report for the GAN, with quality=highest (e.g. RSSI=63) (operation 510) and this is then transmitted (operation 508).

For simplicity of illustration, in the embodiments described below the setting of the quality level for the GAN is shown in both branches, with quality=X and quality=Y, where X and Y may be equal or different.

Figure 6:
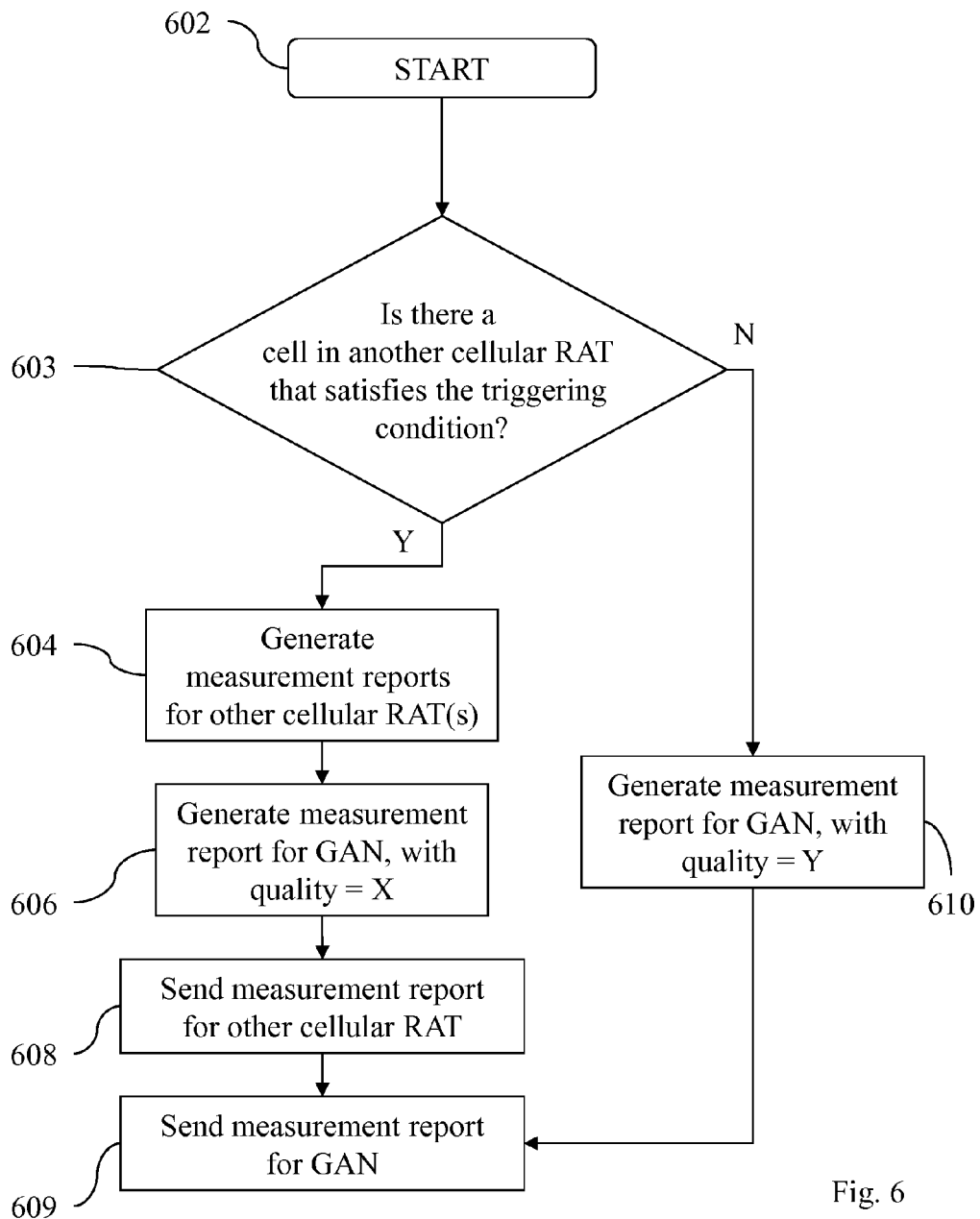
FIG. 6 is a flow chart illustrating a third embodiment of the described technique.

FIG. 6 is a flow chart illustrating a further embodiment of a method carried out by the MS 10 to implement this technique. The same start conditions as discussed with reference to FIG. 3 are in place (602). The MS is in cellular preferred mode, the MS is registered with a GANC that that operates as a network component of the second cellular radio access technology (e.g. a GERAN network component) and camped on first cellular RAT e.g. UMTS, the connection with the first cellular RAT is weak, the connection with the GAN is strong and a request has been received to send an inter-RAT measurement report. The MS checks whether there is a cell in another cellular RAT that satisfies the triggering condition (operation 603). If there is no cell in another cellular RAT (e.g. GERAN) that satisfies the triggering condition, the MS generates a measurement report for the GAN (operation 610). This is then sent to the network (operation 609). If there is at least one cell in another cellular RAT (e.g. GERAN) that satisfies the triggering condition, the MS 10 configures measurement reports for the other cellular RAT (operation 604) and then generates a measurement report for the GAN (operation 606). The MS then sends an event 3A measurement report for the 2G cell(s) (operation 608). A second measurement report in respect of the GAN cell is then sent after sending the measurement report for the 2G cell(s) (operation 609). The second report includes the registered GAN cell and may be sent immediately after sending the first Event 3A report (operation 608). The assumption here is that the UTRAN would process the Event 3A reports in the order in which they are sent and, if the result of processing the first Event 3A report was to perform a successful handover to 2G, the second report would be ignored.

Figure 7:
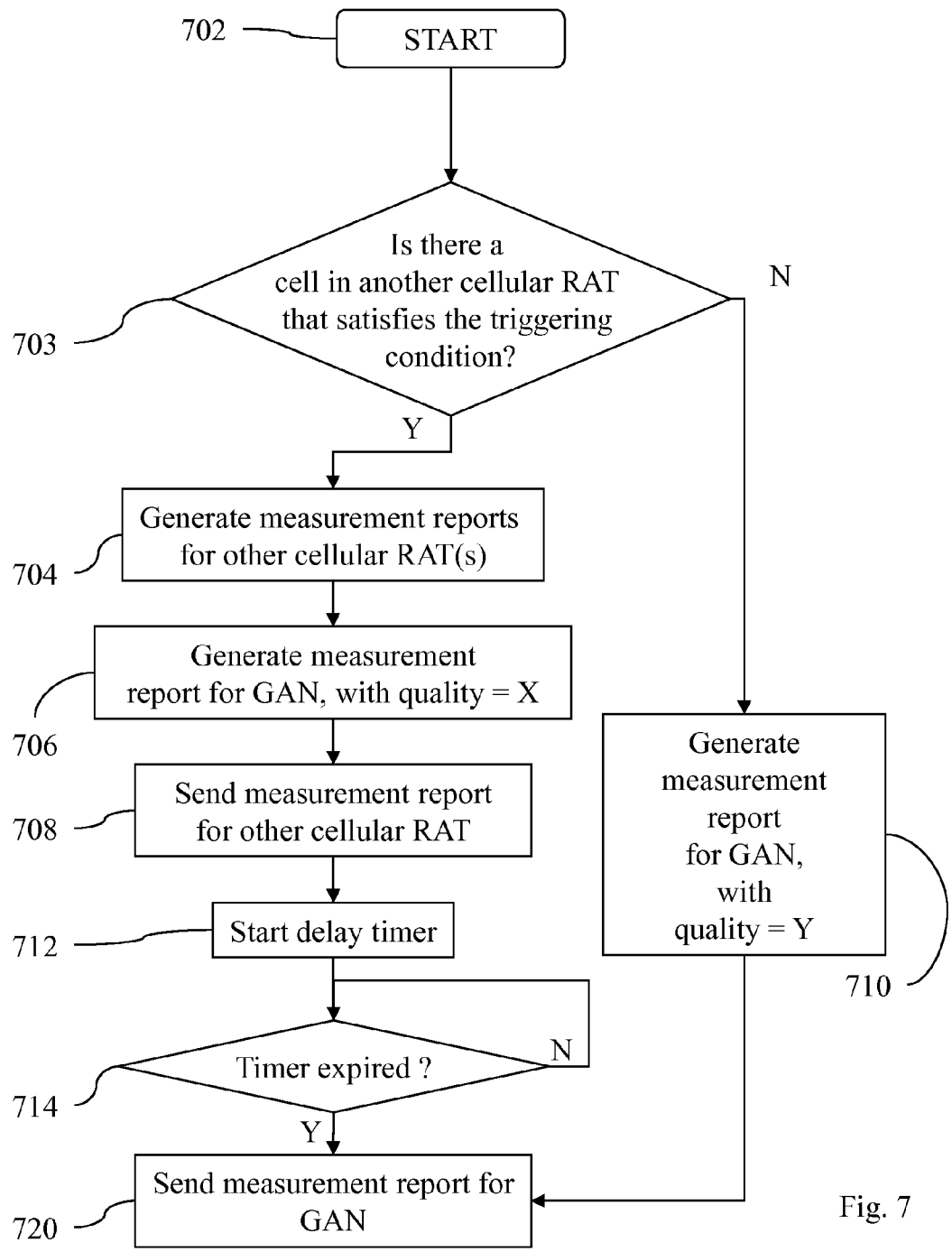
FIG. 7 is a flow chart illustrating a fourth embodiment of the described technique.

In a further embodiment, the second report is sent after a delay. After sending the measurement report in respect of the other cellular RAT, the MS starts a timer. If the timer expires the second report is sent. However, if a handover to the other cellular RAT (e.g. 2G) is successful prior to expiry of the timer, or the MS left Cell_DCH for any other reason, then the timer is stopped and the second report is not sent. This is illustrated in FIG. 7. The delay of the timer may be selected as appropriate. Suitable values for the delay are likely to be between 50 ms and 10 s. For instance, the delay may be calculated based on the likely worst case time period between sending of the measurement report in respect of the other cellular RAT and a handover command being sent by the network. This may for instance be between 50 ms to 5000 ms, for instance 800 to 4000 ms, for instance 2000 to 3000 ms, for instance 2500 ms. The delay may be set dynamically. For instance, the UE may for example measure the time period between sending the measurement report and receiving a handover command message (HOFU). The delay may then be set, for instance, to an average of the measured time periods. For instance, if a MS measures that handover commands are received within x ms of sending the measurement report, the delay may be set to at least x ms.

For instance the time period may be calculated as follows:
Typical time from start of Event 3A to receiving Handover From UTRAN (HOFU) complete command is around 1800 ms
If PDU 2 of 2 of HOFU is missed, network does not notice so wait for a network poll timer to expire (say 200 ms)

After than delay, UE sends status PDU and UTRAN retransmits PDU, so adding another say 150 ms for PDU loss (for a typical SRB round trip time of 150 ms based on typical 40 ms TTI)

Allow for another retransmission (either in Event 3A or HOFU)—add another 350 ms Total=1800+350+350=2500 ms FIG. 7 is a flow chart illustrating a further embodiment of a method carried out by the MS 10 to implement this technique. The same start conditions as discussed with reference to FIG. 3 are in place (702). The MS is in cellular preferred mode, the MS is registered with a GANC that that operates as a network component of the second cellular radio access technology (e.g. a GERAN network component) and camped on first cellular RAT e.g. UMTS, the connection with the first cellular RAT is weak, the connection with the GAN is strong and a request has been received to send an inter-RAT measurement report. In this embodiment, when the MS is triggered to generate inter-RAT measurement reports (operation 702), the MS checks whether there is a cell in another cellular RAT that satisfies the triggering condition (operation 703). If there is no cell in another cellular RAT (e.g. GERAN) that satisfies the triggering condition, the MS generates a measurement report for the GAN (operation 710). This is then sent to the network (operation 720). If there is at least one cell in another cellular RAT (e.g. GERAN) that satisfies the triggering condition, the MS 10 configures measurement reports for the other cellular RAT (operation 704) and then generates a measurement report for the GAN (operation 706). The MS then sends an event 3A measurement report for the other cellular RAT (operation 708). The MS then starts a delay timer (operation 712). When the timer expires (operation 714) the second measurement report in respect of the GAN cell is then sent (operation 720). As mentioned above and not illustrated, if handover to the other cellular RAT was successful prior to expiry of the timer, or the MS left Cell_DCH for any other reason, then the timer is stopped and the second report is not sent.

EXAMPLE

A MS in cellular preferred mode enters a building during a voice call on a 3G cell. The MS is registered on a GAN cell which was previously weak, but on entry into the building it is now considered desirable, and 3G coverage is considered undesirable. It would be preferable for the MS to handover to GAN than to stay on 3G, even though MS is in cellular preferred mode.

However, there is a 2G cell that satisfies event 3A triggering condition. With the proposed technique, the UTRAN is informed about both the 2G and GAN cells. The MS 10 is triggered to generate inter-RAT measurement reports event 3A. When the MS is operating according to UMTS, this trigger might be when the estimated quality of the currently used UTRAN frequency is below a certain threshold and the estimated quality of the other system (GERAN) is above a certain threshold, so triggering an inter-RAT measurement report for event 3a, as set out in TS 25.331 section 14.3.1.1. The MS then checks whether there are any GERAN cells from the Inter-RAT measurement object list that satisfy the triggering condition of the configured event (as described in TS 25.331). If so, the MS then generates a measurement report for the neighbouring cells. The MS also generates a measurement report for the GAN cell, with RSSI set appropriately. The MS then sends the generated measurement reports for the neighbouring cells and the GAN cell to the network (either as a combined report or as separate reports as discussed above). If there is no GERAN cell that satisfies the triggering condition, then the MS generates a measurement report for the GAN cell only and the MS then sends the generated measurement report for the GAN cell to the network.

The UTRAN can thus attempt to handover to 2G and, if that fails, it can attempt to handover to GAN. If that handover is successful, the call is successfully handed over to GAN and will run to completion, instead of being dropped because handover to 2G was not successful.

A similar approach may be applied when a MS in cellular preferred mode enters a building during a voice call on a 2G cell. The MS is registered on a Iu mode GAN cell which was previously weak, but on entry into the building it is now considered desirable, and 2G coverage is considered undesirable. Thus the MS would prefer to handover to the Iu GAN than to stay on 2G, even though MS is in cellular preferred mode However, there is a 3G cell that satisfies a measurement triggering condition. With the proposed technique, the GERAN is informed about both the 3G and GAN cells. The MS 10 receives a trigger to generate inter-RAT measurement reports. When the MS is operating according to GERAN, this trigger might be when the estimated quality or strength of the currently used GSM time slot is below a certain threshold and the estimated quality of the other system (UMTS) is above a certain threshold, so triggering an inter-RAT measurement configuring event. The MS then checks whether there are any UTRAN cells from the Inter-RAT measurement object list that satisfy the triggering condition of the configured event. If so, the MS then generates a measurement report for the neighbouring UTRAN cells. The MS also generates a measurement report for the GAN cell, with the quality level set appropriately. The MS then sends the generated measurement reports for the neighbouring cells and the GAN cell to the network (either as a combined report or as separate reports as discussed above). If there is no UTRAN cell that satisfies the triggering condition, then the MS generates a measurement report for the GAN cell only and the MS then sends the generated measurement report for the GAN cell to the network.

The GERAN can thus attempt to handover to 3G and, if that fails, it can attempt to handover to GAN. If that handover is successful, the call is successfully handed over to GAN and will run to completion, instead of being dropped because of unsuccessful handover to 3G.

A similar approach may be applied when a MS in cellular preferred mode enters a building during a voice call on an E-UTRAN cell. The MS is registered on a A/Gb mode GAN cell which was previously weak, but on entry into the building it is now considered desirable, and 2G coverage is considered undesirable. Thus the MS would prefer to handover to the GAN than to stay on E-UTRAN, even though MS is in cellular preferred mode However, there is a GERAN cell that satisfies a measurement triggering condition. With the proposed technique, the E-UTRAN is informed about both the GERAN and GAN cells. The MS 10 receives a trigger to generate inter-RAT measurement reports. When the MS is operating according to E-UTRAN, this trigger might be when the estimated quality of the currently used E-UTRAN frequency is below a certain threshold, so triggering an inter-RAT measurement configuring event. The MS then checks whether there are any GERAN cells from the Inter-RAT measurement object list that satisfy the triggering condition of the configured event. If so, the MS then generates a measurement report for the neighbouring GERAN cells. The MS also generates a measurement report for the GAN cell, with the quality level set appropriately. The MS then sends the generated measurement reports for the neighbouring cells and the GAN cell to the network (either as a combined report or as separate reports as discussed above). If there is no GERAN cell that satisfies the triggering condition, then the MS generates a measurement report for the GAN cell only and the MS then sends the generated measurement report for the GAN cell to the network.

The E-UTRAN can thus attempt to handover to 2G and, if that fails, it can attempt to handover to GAN. If that handover is successful, the call is successfully handed over to GAN and will run to completion, instead of being dropped because of unsuccessful handover to 2G.

There has therefore been described a device operable with a first cellular radio access technology (RAT) (e.g. a third generation RAT e.g. UMTS, E-UTRAN), a second cellular radio access technology (e.g. a second generation RAT e.g. GSM or a GSM based RAT e.g. GPRS or GSM EDGE etc.) and a non-cellular radio access technology (e.g. Generic Access Network (e.g. via an access point conforming to one of the IEEE 802.xx standards)), the mobile telecommunications device being capable of adopting a cellular preferred mode in which the device is set to operate with a cellular RAT (e.g. UMTS/E-UTRAN/GERAN) rather than a non-cellular RAT such as the GAN. When the mobile telecommunications device is in a cellular preferred mode and operating with the first cellular radio access technology and the mobile telecommunications device is registered with Generic Access Network Controller that operates like a network component of the second cellular radio access technology, and a quality of a signal from the first cellular radio access technology is below a certain threshold and a quality of a signal from the generic access network is above a certain threshold and a request has been received to send an inter-radio access technology measurement report, generating inter-radio access technology measurements and, when there is at least one cell of the second cellular radio access technology that satisfies a triggering condition, transmitting a measurement report in respect of the second cellular radio access technology cell(s) and a measurement report in respect of the generic access network.

Handover to the GAN can therefore be attempted if attempts to handover to the second cellular RAT fail, without the need for further signalling between the MS and the network.

Figure 8:
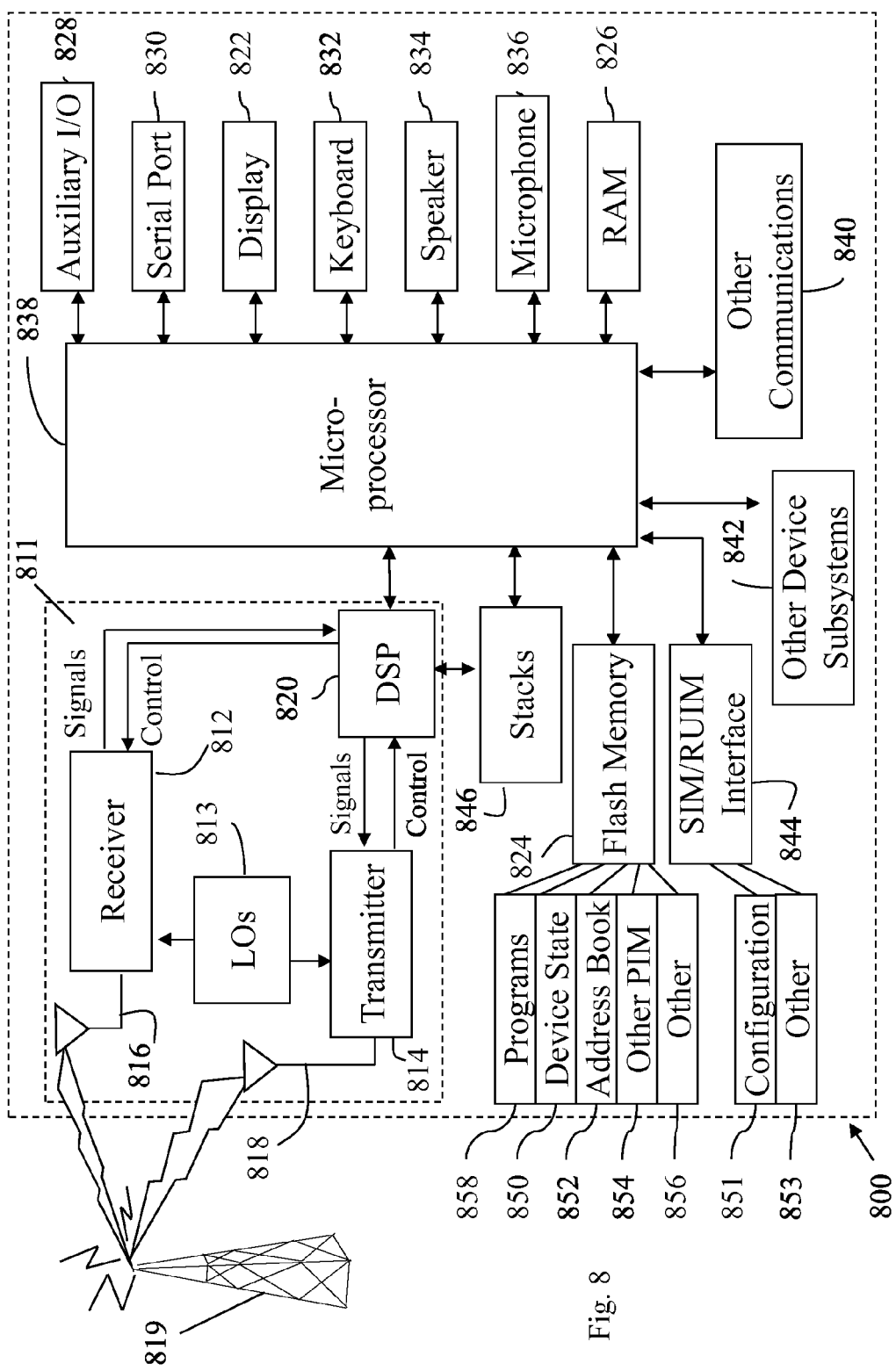
FIG. 8 is a block diagram illustrating a mobile device, which can act as a MS and co-operate with the apparatus and methods of FIGS. 1 to 7.

Turning now to FIG. 8, FIG. 8 is a block diagram illustrating a mobile device, which can act as a MS and co-operate with the apparatus and methods of FIG. 1 to *, and which is an exemplary wireless communication device. Mobile station 800 is preferably a two-way wireless communication device having at least voice and data communication capabilities. Mobile station 800 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 800 is enabled for two-way communication, it will incorporate a communication subsystem 811, including both a receiver 812 and a transmitter 814, as well as associated components such as one or more, preferably embedded or internal, antenna elements 816 and 818, local oscillators (LOs) 813, and processing means such as a processing module such as a digital signal processor (DSP) 820. As will be apparent to those skilled in the field of communications, the particular design of the communication subsystem 811 will be dependent upon the communication network in which the device is intended to operate. For example, mobile station 800 may include a communication subsystem 811 designed to operate within the Mobitex™ mobile communication system, the DataTAC™ mobile communication system, GPRS network, UMTS network, or EDGE network.

Network access requirements will also vary depending upon the type of network 802. For example, in the Mobitex and DataTAC networks, mobile station 800 is registered on the network using a unique identification number associated with each mobile station. In UMTS and GPRS networks, however, network access is associated with a subscriber or user of mobile station 800. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 800 will be unable to carry out any other functions involving communications over the network 802. The SIM interface 844 is normally similar to a card-slot into which a SIM card can be inserted and ejected like a diskette or PCMCIA card. The SIM card can have approximately 64K of memory and hold many key configuration 851, and other information 853 such as identification, and subscriber related information.

When required network registration or activation procedures have been completed, mobile station 800 may send and receive communication signals over the network 802. Signals received by antenna 816 through communication network 802 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 802 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile station 800 preferably includes processing means such as a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, keyboard 832, speaker 834, microphone 836, a short-range communications subsystem 840 and any other device subsystems generally designated as 842.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 is preferably stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the mobile station. A predetermined set of applications that control basic operations, including at least data and voice communication applications for example, will normally be installed on mobile station 800 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 802. In a preferred embodiment, the PIM data items are seamlessly integrated, synchronized and updated, via the wireless network 802, with the mobile station user's corresponding data items stored or associated with a host computer system. Further applications may also be loaded onto the mobile station 800 through the network 802, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the mobile station 800.

In a data communication mode, a received signal such as a text message or web page download will be processed by the communication subsystem 811 and input to the microprocessor 838, which preferably further processes the received signal for output to the display 822, or alternatively to an auxiliary I/O device 828. A user of mobile station 800 may also compose data items such as email messages for example, using the keyboard 832, which is preferably a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of mobile station 800 is similar, except that received signals would preferably be output to a speaker 834 and signals for transmission would be generated by a microphone 836. Alternative voice or audio I/O subsystems, such as a voice message recording subsystem, may also be implemented on mobile station 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8, would normally be implemented in a personal digital assistant (PDA)-type mobile station for which synchronization with a user's desktop computer (not shown) may be desirable, but is an optional device component. Such a port 830 would enable a user to set preferences through an external device or software application and would extend the capabilities of mobile station 800 by providing for information or software downloads to mobile station 800 other than through a wireless communication network. The alternate download path may for example be used to load an encryption key onto the device through a direct and thus reliable and trusted connection to thereby enable secure device communication.

Other communications subsystems 840, such as a short-range communications subsystem, is a further optional component which may provide for communication between mobile station 800 and different systems or devices, which need not necessarily be similar devices. For example, the subsystem 840 may include an infrared device and associated circuits and components or a Bluetooth™ communication module to provide for communication with similarly enabled systems and devices.

When mobile device 800 is used as a MS, protocol stacks 846 include apparatus and a method for handling inter-radio access technology measurement requests in a mobile telecommunications device.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a MS or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method for handling inter-radio access technology measurement reports in a radio telecommunications device, the device being operable with a first cellular radio access technology, GSM EDGE Radio Access Network (GERAN) and Generic Access Network, the radio telecommunications device being capable of adopting a cellular preferred mode, the method comprising, in the radio telecommunications device:

when the radio telecommunications device is in cellular preferred mode and operating with the first cellular radio access technology and the radio telecommunications device is registered with a Generic Access Network Controller that operates as a GERAN network component, and a quality of a signal from the first cellular radio access technology is below a certain threshold, and a quality of a signal from the GAN is above a certain threshold and responsive to a request, that has been received, to send an inter-radio access technology (RAT) measurement report:

generating inter-radio access technology measurements and, when there is at least one GERAN cell that satisfies a triggering condition:

transmitting a measurement report in respect of the GERAN cell(s) and a measurement report in respect of the generic access network;

wherein the measurement report in respect of the GERAN cell(s) and the measurement report in respect of the generic access network are transmitted as separate reports separated by a delay in one of the following ranges: between 50 ms to 5000 ms; 800 to 4000 ms; 2000 to 3000 ms, the measurement report in respect of the GERAN cell(s) being transmitted before the measurement report in respect of the generic access network.

2. A method in accordance with claim 1 wherein the measurement report in respect of the generic access network reports that the generic access network has the best possible receiving level.

3. A method in accordance with claim 1 wherein the measurement report in respect of the GERAN cell(s) includes a receiving level for at least one GERAN cell and wherein the measurement report in respect of the generic access network is allocated a receiving level lower than the lowest receiving level for the GERAN cell(s).

4. A method in accordance with claim 1 wherein the measurement report in respect of the generic access network is transmitted after a delay relative to the transmitting of the measurement report in respect of the GERAN cell(s).

5. A method according to claim 1 wherein the first cellular radio access technology is one of UMTS and LTE.

6. A non-transitory computer-readable medium having computer-executable instructions adapted to cause a device to perform the method of claim 1.

7. A data carrier carrying thereon or therein data indicative of instructions executable by processing means to cause those means to carry out a method according to claim 1.

8. A radio telecommunications device operable with a first cellular radio access technology, GSM EDGE Radio Access Network (GERAN) and a Generic Access Network, the radio telecommunications device being capable of adopting a cellular preferred mode, the device comprising:

a transceiver for transmitting and receiving radio signals;
a processor; and
a memory having stored therein one or more routines executable by the processor, the one or more routines being adapted to:

when the radio telecommunications device is in cellular preferred mode and operating with the first cellular radio access technology and the radio telecommunications device is registered with a Generic Access Network Controller that operates as a GERAN network component, and a quality of a signal from the first cellular radio access technology is below a certain threshold and a quality of a signal from the GAN is above a certain threshold and responsive to a request, that has been received, to send an inter-RAT measurement report:

generate inter-radio access technology measurements and, when there is at least one GERAN cell that satisfies a triggering condition:

transmit a measurement report in respect of the GERAN cell(s) and a measurement report in respect of the generic access network;

wherein the measurement report in respect of the GERAN cell(s) and the measurement report in respect of the generic access network are transmitted as separate reports separated by a delay in one of the following ranges: between 50 ms to 5000 ms; 800 to 4000 ms; 2000 to 3000 ms, the measurement report in respect of the GERAN cell(s) being transmitted before the measurement report in respect of the generic access network.

9. A device in accordance with claim 8 wherein the measurement report in respect of the generic access network reports that the generic access network has the best possible receiving level.

10. A device in accordance with claim 8 wherein the measurement report in respect of the GERAN cell(s) includes a receiving level for at least one GERAN cell and wherein the measurement report in respect of the generic access network is allocated a receiving level lower than the lowest receiving level for the GERAN cell(s).

11. A device in accordance with claim 8 wherein the measurement report in respect of the generic access network is transmitted after a delay relative to the transmitting of the measurement report in respect of the GERAN cell(s).

12. A device according to claim 8 where the first cellular radio access technology is one of UMTS and LTE.

* * * * *